UNITED STATES PATENT OFFICE.

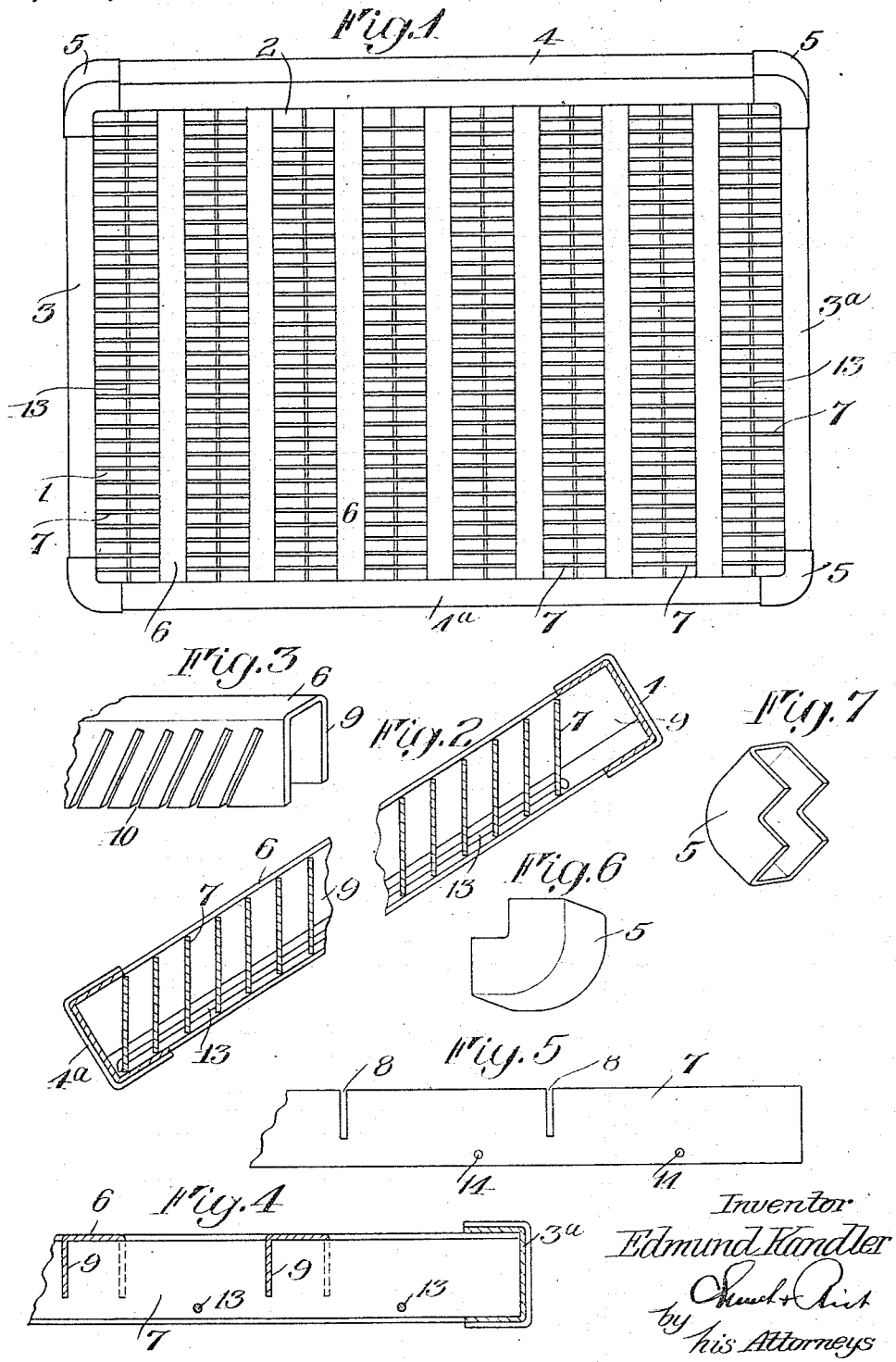

EDMUND KANDLER, OF ROCHESTER, NEW YORK, ASSIGNOR TO BAUSCH & LOMB OPTICAL COMPANY, OF ROCHESTER, NEW YORK, A CORPORATION OF NEW YORK.

OPHTHALMIC-TEST-LENS TRAY.

1,285,212.

Specification of Letters Patent. Patented Nov. 19, 1918.

Application filed May 27, 1918. Serial No. 236,881.

*To all whom it may concern:*

Be it known that I, EDMUND KANDLER, a citizen of the United States, residing at Rochester, in the county of Monroe and State of New York, have invented certain new and useful Improvements in Ophthalmic-Test-Lens Trays; and I do hereby declare the following to be a full, clear, and exact description of the same, reference being had to the accompanying drawings, forming a part of this specification, and to the reference-numerals marked thereon.

This invention relates to that class of trays used for holding the various lenses of an ophthalmic test lens set, such as are employed by opticians in testing the refractive properties of a patient's eyes preparatory to fitting eyeglasses. The object of the invention is to provide an improved sanitary tray for ophthalmic test lenses of the kind described in my pending application Serial No. 144,351, filed January 25, 1917. To these and other ends the invention consists in certain improvements and combinations of parts, all as will be hereinafter more fully described, the novel features being pointed out in the claims at the end of the specification.

In the drawings:

Figure 1 is a plan view of a test lens tray constructed in accordance with my invention;

Fig. 2 is a transverse sectional view of the device shown in Fig. 1, partly broken away;

Fig. 3 is an enlarged perspective view of one of the inner channel partitions of the tray, one end being broken away;

Fig. 4 is a longitudinal sectional view partly broken away and taken along the face of one of the plate partitions;

Fig. 5 is a face view of one of the plate partitions partly broken away;

Fig. 6 is a perspective view of one of the corner members of the frame, and

Fig. 7 is a similar view of the same in another position.

Similar reference numerals in the several figures indicate the same parts.

My improved test lens tray may be made of any form and of any size required to include the requisite number of narrow lens chambers 1, which may receive comparatively thin spherical and cylindrical lenses, and a comparatively few, say four, wider chambers 2 which may receive thicker prismatic lenses. The frame of the tray comprises two sheet metal channel end portions 3 and 3$^a$, and front and rear sheet metal channel frame portions 4$^a$ and 4. At the adjacent ends of the frame and end portions, or the corners of the frame, the adjacent ends of the members 3, 3$^a$ and 4, 4$^a$ are connected by means of sheet metal corner members 5, shown in Figs. 6 and 7, struck up to fit over the ends. The frame, when assembled in this manner, presents a pleasing, neat appearance with round corners and possesses the qualities of lightness, rigidity and durability.

In the construction illustrated, the lens chambers 1 and 2 are entirely open at the top and only slightly obstructed at the bottom. Said chambers are formed by a series or plurality of substantially parallel inner metal channel partitions 6 of which seven are illustrated in the drawings, and two end frame portions 3 and 3$^a$, also substantially parallel therewith. The spaces formed between the members 3, 3$^a$, 6, 4 and 4$^a$ are subdivided by a series or plurality of flat sheet metal plates substantially parallel with the frame members 4 and 4$^a$ into a series or plurality of chambers 1 and 2, described above. The partitions 6 are spaced substantially equidistant from each other and from the end frame members 3 and 3$^a$, forming a series or plurality of substantially parallel elongated chambers, each of which is subdivided by the plates 7 into a series or plurality of lens chambers or cells 1, 2. The sheet metal frame portions 3, 3$^a$, 4 and 4$^a$ are struck up from sheet metal substantially U-shaped in cross section, with the open sides directed inwardly. The ends of the plates 7 extend into the open sides of the members 3 and 3$^a$, and are inclined rearwardly from the vertical, so that they assume a substantially vertical position when the tray is tilted forwardly. Each of the plates 7 is provided with a series or plurality of slots 8 extending downwardly from the top edge at substantially right angles to the length of the plate and to a depth corresponding substantially to the depth of the partition 6. The slots 8 are spaced from each other and from the ends of the plate to coincide with the left hand walls 9 of the partition members 6. The right hand walls 11 of the partition members 6 are also slotted, as seen at 10, to a depth of substantially the full width of the wall. The slots 10 are spaced and inclined from the vertical to correspond with the spacing and inclination of the plates 7. When assembled, the partitions 6 fit over the plates 7, which extend into the slots 10, and the walls 9 extend into the slots 8.

A wire or light rod 13 extends through each row of cells or chambers near its bottom and is supported in the plates 7 by extending through openings 14 provided therefor in the plates. The ends of the rods 13 are secured in position by being upset or bent exteriorly the front and rear plates. The rods or wires 13 serve as light and convenient supports for the test lenses in the cells.

Practically all portions of this improved test lens tray may be made of metal, celluloid, or other tough, readily cleansible material. Since the lens cells or chambers are entirely open at the top and are only slightly obstructed at the bottom by the lens retaining wires, it is obvious that it may be readily cleansed by pouring upon and through it antiseptic fluids, or it may be immersed in a bath of such fluid or boiling water and thus at all times be kept thoroughly sterilized for safe use.

I claim as my invention:

1. An ophthalmic test lens tray comprising a frame, a plurality of plate partitions extending across said frame, a substantially inverted U-shaped channel partition supported on said plate partitions to form a plurality of lens cells, each of said plate partitions being provided with a slot to receive a wall of the channel partition and the other wall of the channel partition being provided with slots to engage the plate partitions, and means for supporting lenses in said cells.

2. An ophthalmic test lens tray comprising a frame, a plurality of inclined plate partitions extending across said frame, an inverted substantially U-shaped channel partition supported on said plate partitions, and interlocking means between said partitions comprising a plurality of inclined slots extending substantially the full depth of one wall of the channel partition adapted to engage the plate partition, and a slot substantially perpendicular to the axis of each of the plate partitions in engagement with the other wall of the channel partition, and means secured in the plate partitions for supporting lenses.

EDMUND KANDLER.

Copies of this patent may be obtained for five cents each, by addressing the "Commissioner of Patents, Washington, D. C."